Feb. 16, 1937.　　G. E. SHIPWAY ET AL　　2,071,291
WALL ASSEMBLY AND CLIP
Filed Sept. 19, 1935
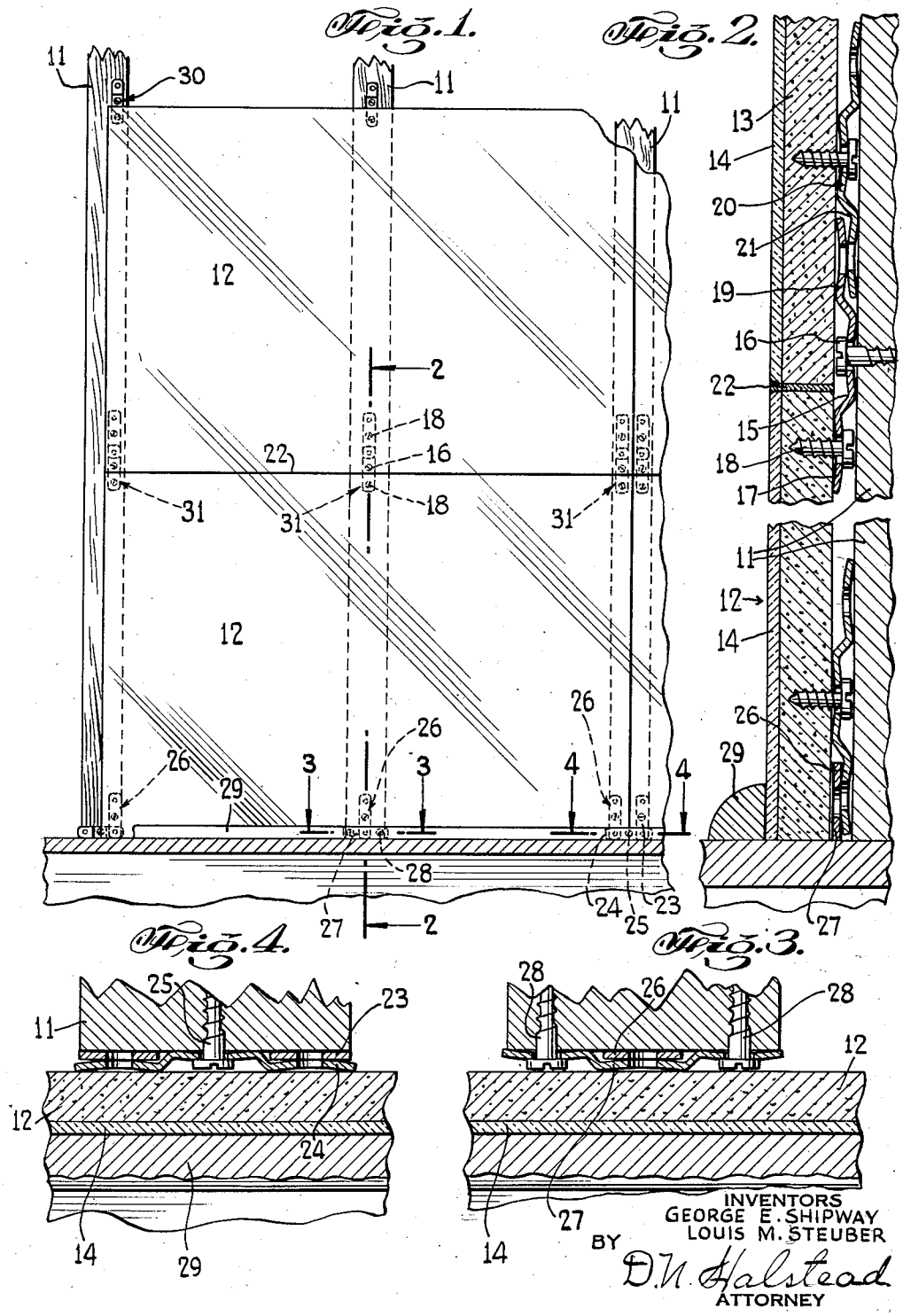
INVENTORS
GEORGE E. SHIPWAY
LOUIS M. STEUBER
BY
D. N. Halstead
ATTORNEY Patented Feb. 16, 1937

2,071,291

UNITED STATES PATENT OFFICE 2,071,291

WALL ASSEMBLY AND CLIP

George E. Shipway, Darien, Conn., and Louis M. Steuber, New York, N. Y., assignors to Johns-Manville Corporation, New York, N. Y., a corporation of New York Application September 19, 1935, Serial No. 41,234

5 Claims. (Cl. 72—19)

This invention relates to a wall assembly adapted for use as an interior wall, ceiling, or the like and to a clip or coacting clips for use therein.

There is widespread use of interior wall or partition assemblies, for example, including studs or other supporting substructure, units of facing material, and means securing the units to the substructure.

Facing units that are especially desirable for certain purposes contain a panel, such as a compressed and hardened sheet of asbestos fibres and Portland cement and, in some cases, a glass facing element secured over the said panel. Such a composite panel is substantially unbendable, that is, cannot be flexed greatly without breakage of the glass facing element, and the glass, if used, cannot well be penetrated by fastening means. The back of the panel is adapted to hold a screw.

In securing substantially unbendable units in a wall assembly or for supporting other substantially rigid units on a substructure, there is need of means for avoiding the necessity of causing the units to conform to what may be irregularities of surface of the substructure and/or for spacing the units from the substructure, to avoid rattling of the units against the substructure at all times. There is need, also, for simple and convenient fastening means for securing the units to a substructure without penetration of the units by the fastening means or exposure of the said means to view in the finished assembly. It is desirable, furthermore, to support the units upon the substructure in appreciably resilient or yieldable manner, whereby tightness of engagement may be had without the introduction of excessive local strain upon any part of the assembly. The invention comprises a wall assembly, a clip, and/or a coacting arrangement of a plurality of clips meeting one or more of the above stated requirements for a desirable type of wall assembly, as well as other novel features hereinafter described.

A preferred embodiment of the invention is illustrated in the attached drawing and will be described in connection therewith.

Fig. 1 shows a front view of a portion of a wall assembly constructed in accordance with the invention.

Figs. 2, 3, and 4 are sectional views, on an enlarged scale, on the section lines 2—2, 3—3, and 4—4, respectively, of Fig. 1.

The assembly includes a supporting substructure such as the wooden studs 11, units of facing material 12, forming joints between adjacent edges thereof, and means securing the said units to the substructure.

The facing units may be substantially unbendable and consist of a sheet 13 of backing material such as the asbestos-cement panel described and a facing element of glass 14 secured thereto as by a suitable adhesive (not shown).

The fastening means include a clip, a portion 15 thereof, an element 16, as, for instance, a screw or the like, securing the said portion to the substructure, and a part 17 offset with respect to the said portion, spaced from the substructure, and secured to a unit of facing material by an element 18, such as a self-tapping screw.

Suitably, the elements 16 and 18 extend through pre-formed holes in the clip, as illustrated. The portion 17 of the clip may be an end portion and the clip may have another corresponding end portion 19 lying generally in the same plane with the portion 17. The midportion 15 is depressed with respect to the said plane of the end portions, suitably by an amount substantially equal to the thickness of head of the fastening element 16. When the strip is made of strip metal of proper thickness, say, of the order of 10 gauge, the clip is strong and yet is appreciably resilient under impact, particularly in view of the offsetting of various portions. The clip may be bent.

The edge portion of an adjacent panel may be provided with a similar clip arranged in reverse manner, as with the depressed midportion 20 secured to the facing unit and a part 21 spaced therefrom and engaged behind the end portion 19 of a clip on the first-mentioned unit (Fig. 2).

Suitably, the several parts or portions of the clips are individually slightly curved to provide two-point contacts each and eliminate rocking. If desired, the joint between adjacent facing units may be closed, as by a composition 22 applied in plastic form and allowed to harden or by means of a resilient joint filler strip of a cork composition or the like.

At the base portion of the assembly, clips of the same type may be used but arranged differently. Thus, at the lower corner of a facing unit (Fig. 4) an end portion 23 of a clip, corresponding to the portion 21 of the clip illustrated in Fig. 2, is engaged behind an end portion 24 of another clip, of the type described. This other clip is secured to the substructure, as illustrated at 25, and extends transversely with respect to the direction of the clip having the end portion 23.

The clip arrangement that may be used to secure the midportion of a facing unit to the substructure is illustrated in Fig. 3. Here again two clips are arranged transversely, the end 26 of one clip being engaged behind a portion, suitably the midportion 27 of another clip, one clip being secured to the facing material, as illustrated in Fig. 1, and the other clip being secured to the substructure as by means 28, suitably, a screw.

At the lower portion of the assembly a molding 29 or other suitable member may be used to cover the crack between the wall assembly and the floor.

At the top of the assembly, as illustrated in Fig. 1, any suitable means may be used to secure the facing units to the substructure. Thus, there may be used a clip 30, similar to the clips used elsewhere and described above, secured at one portion to the substructure and having a lower offset portion, such as 17 (Fig. 2) extending downwardly behind the back of the facing units and secured thereto. The clip 30 is concealed from view in the finished assembly. A conventional type of molding (not shown) may be used at the top of the assembly.

In making the assembly described, there are provided the supporting substructure, facing units, clips, and screws or other elements to be used to secure the clips to the facing units and/or to the substructure. The clips illustrated in Fig. 1 as extending horizontally are then secured to the studs 11 near the bottoms thereof. Vertically extending clips 26 are then secured to the facing units, with the lower portion or legs of the clips adapted to be engaged by a portion of the transversely extending clips, as illustrated in Figs. 3 or 4. The clips 31 extending vertically, as illustrated in Fig. 1, are also secured in position near the top edges of the facing units. A unit so equipped is then placed in position, with the transversely extending clips near the bottom of the assembly engaging each other. Next, the clips 31 are secured at their midportions to the studs 11. Then the facing unit that is to constitute the second course in the assembly is equipped with the suitable clips and is seated in position, as illustrated in section in Fig. 2 or in plan view in Fig. 1. Finally, the top course of the facing units is secured at the upper edge thereof to the substructure, as by the members 30, secured first to the back of the units and then to the studs, as described.

It will be noted that the curvature of the end portions of the clips, as shown in Fig. 2, for instance, adapts those portions to be slipped past the ends of clips engaged thereby, while promoting overall springliness of the engagement.

It will be noted, also, that there is a space defined between the facing units and the substructure so that substantial irregularities on the face of the substructure do not require bending or conformance of the facing units thereover.

Also, the clips are adapted to engage each other when extending either in the same direction or transversely.

Finally, the midportion of the clips may be secured either to the facing units or to the substructure, clips that engage each other being reversed in this respect.

It will be understood that the details given are for the purpose of illustration, not restriction, and particularly that certain elements or features may be omitted if their functions are not desired in the finished structure. It is intended, therefore, that variations within the spirit of the invention should be included within the scope of the appended claims.

What we claim is:

1. A wall assembly comprising a supporting substructure, units of facing material, and means securing the units to the substructure, the said means including a clip, an element securing a portion thereof to the substructure, a part of the clip offset with respect to the said portion and spaced from the substructure, another clip, and means securing a portion thereof to one of the said units, a part of the latter clip engaging the said part of the first-mentioned clip.

2. A wall assembly comprising a supporting substructure, units of facing material, and means securing the units to the substructure, the said means including a clip, an element securing the midportion thereof to the substructure, parts of the clip on both sides of the midportion offset with respect thereto, another clip, and means securing the latter clip to one of the facing units, a portion of the latter clip engaging one of the said parts of the first-mentioned clip.

3. A clip, of the class described, adapted for use in a structure including a supporting substructure and facing units, comprising a metal strip, end portions thereof adapted to contact with the facing material and to be secured at one of the said portions to the facing material and a midportion depressed from the general plane of the said portions and adapted to be secured to the substructure, the said end portions and midportion extending generally parallel to each other.

4. A clip for holding a facing unit upon a supporting substructure, comprising a metal strip, end portions thereof adapted to contact with the facing material and to be secured at one of the said portions to the facing material and a midportion depressed from the general plane of the said portions and adapted to be secured to the substructure, the said end and midportions being each curved and having the convex side thereof disposed in contact with the substructure and facing material, respectively, so that each of the said portions contacts at two spaced points with the substructure or a facing unit.

5. A clip for holding a facing unit upon a supporting substructure, comprising a yieldable metal strip, a portion thereof to be secured to a part of the substructure and another portion, offset with respect to the first-mentioned portion but extending generally parallel thereto, to be secured to a part of a facing unit, at least one of the said portions being appreciably curved and concave on the side thereof to be secured to one of the said parts, so as to provide two-point contact at spaced positions with the said one of the parts and resiliency of holding of the unit to the substructure.

GEORGE E. SHIPWAY.
LOUIS M. STEUBER.